US012332671B2

(12) United States Patent
Syu

(10) Patent No.: US 12,332,671 B2
(45) Date of Patent: Jun. 17, 2025

(54) STARTUP CIRCUIT AND BANDGAP CIRCUIT

(71) Applicant: NANYA TECHNOLOGY CORPORATION, New Taipei (TW)

(72) Inventor: Jia-Wun Syu, Taichung (TW)

(73) Assignee: NANYA TECHNOLOGY CORPORATION, New Taipei (TW)

( * ) Notice: Subject to any disclaimer, the term of this patent is extended or adjusted under 35 U.S.C. 154(b) by 289 days.

(21) Appl. No.: 18/190,121

(22) Filed: Mar. 27, 2023

(65) Prior Publication Data

US 2024/0329675 A1 Oct. 3, 2024

(51) Int. Cl.
*G05F 1/46* (2006.01)
*G05F 1/575* (2006.01)

(52) U.S. Cl.
CPC .............. *G05F 1/468* (2013.01); *G05F 1/461* (2013.01); *G05F 1/575* (2013.01)

(58) Field of Classification Search
CPC ........... G05F 1/461; G05F 1/468; G05F 1/575
See application file for complete search history.

(56) References Cited

U.S. PATENT DOCUMENTS

2006/0052962 A1 3/2006 Shipton et al.
2020/0050225 A1* 2/2020 Fiocchi .................. G05F 1/575
2021/0202001 A1* 7/2021 Jeong .................. G11C 15/046
2024/0255976 A1* 8/2024 Anagnostopoulos ... G05F 3/262

FOREIGN PATENT DOCUMENTS

CN 1879006 12/2006
CN 100517502 7/2009
TW 200640127 11/2006

OTHER PUBLICATIONS

"Office Action of Taiwan Counterpart Application", issued on Jan. 10, 2024, p. 1-p. 5.

* cited by examiner

*Primary Examiner* — Jue Zhang
*Assistant Examiner* — Lakaisha Jackson
(74) *Attorney, Agent, or Firm* — JCIPRNET

(57) ABSTRACT

A startup circuit and a bandgap circuit are provided. The startup circuit includes a start referencing circuit and a driving circuit. The start referencing circuit is configured to receive an enabling signal ramping from a disabled voltage level to an enabled voltage level to generate a reference signal. The driving circuit has an input end coupled to the start referencing circuit and an output end coupled to an operational amplifier circuit of the bandgap circuit. The driving circuit is configured to generate a driving signal to the operational amplifier circuit according to the reference signal. The driving circuit comprises a plurality of buffer circuits coupled in series and at least one of the buffer circuits being a hysteresis buffer.

10 Claims, 5 Drawing Sheets

STARTUP CIRCUIT AND BANDGAP CIRCUIT

BACKGROUND

1. Technical Field

The disclosure generally relates to a circuit, in particular, to a startup circuit and a bandgap circuit.

2. Description of Related Art

In circuit designs, a clean power source crucial to various circuit implementations, such as analog circuit and high speed systems, and noise occurred in the power source usually lead to serious degradation of signal integrity and stability.

SUMMARY

Accordingly, the disclosure is directed to a startup circuit and a bandgap circuit capable of improving signal integrity and stability on its output signal.

The startup circuit of the disclosure is utilized for a bandgap circuit. The startup circuit includes a start referencing circuit and a driving circuit. The start referencing circuit is configured to receive an enabling signal ramping from a disabled voltage level to an enabled voltage level to generate a reference signal. The driving circuit has an input end coupled to the start referencing circuit and an output end coupled to an operational amplifier (Opamp) circuit of the bandgap circuit. The driving circuit is configured to generate a driving signal to the Opamp circuit according to the reference signal. The driving circuit comprises a plurality of buffer circuits coupled in series and at least one of the buffer circuits being a hysteresis buffer.

The bandgap circuit of the disclosure includes an operational amplifier circuit and a startup circuit. The startup circuit includes a start referencing circuit and a driving circuit. The start referencing circuit is configured to receive an enabling signal ramping from a disabled voltage level to an enabled voltage level to generate a reference signal. The driving circuit has an input end coupled to the start referencing circuit and an output end coupled to an operational amplifier circuit of the bandgap circuit. The driving circuit is configured to generate a driving signal to the Opamp circuit according to the reference signal. The driving circuit comprises a plurality of buffer circuits coupled in series and at least one of the buffer circuits being a hysteresis buffer.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
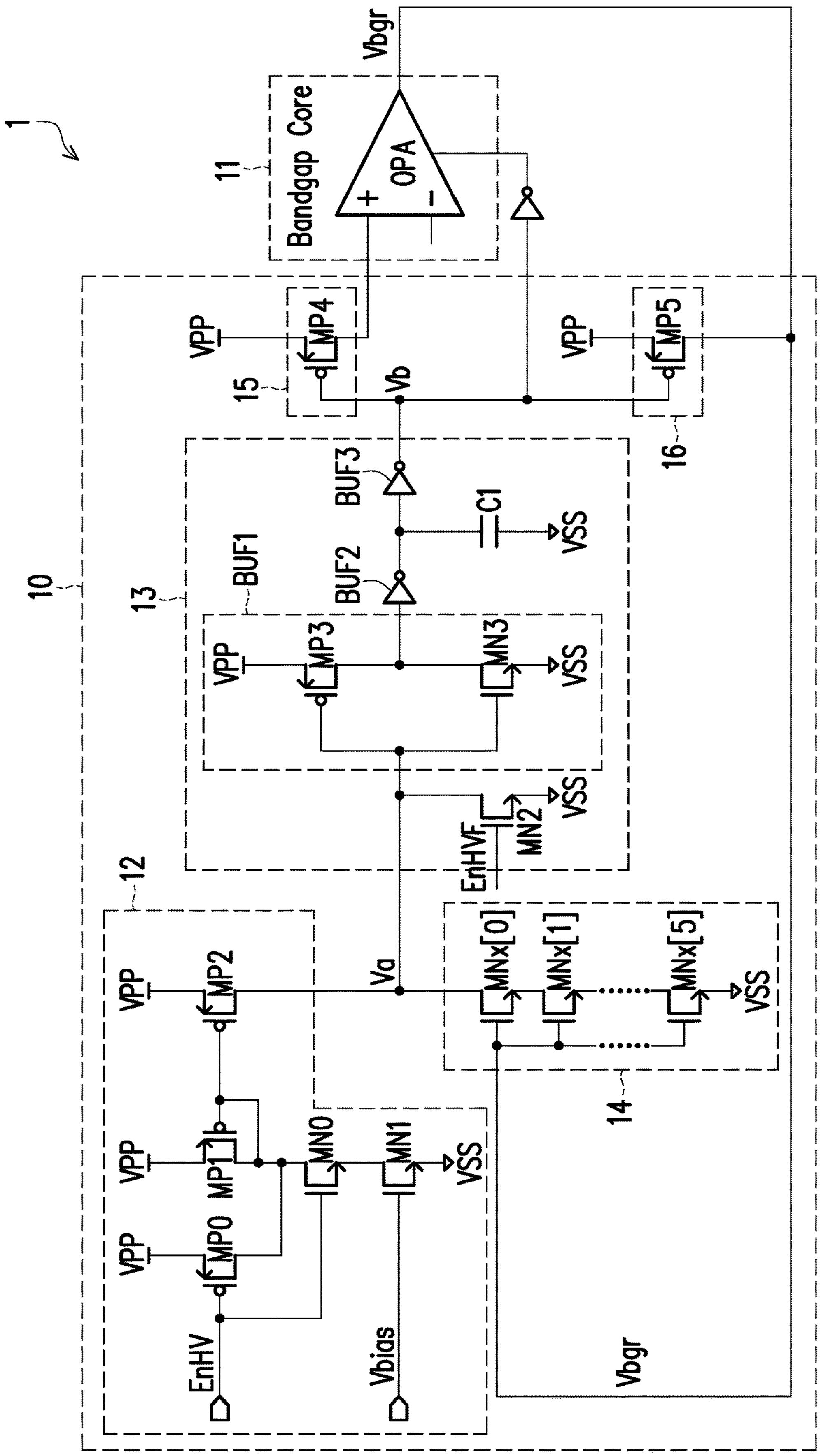
FIG. 1A illustrates a schematic diagram of a bandgap circuit according to some embodiments of the present disclosure.

FIG. 1A illustrates a schematic diagram of a bandgap circuit 1 according to some embodiments of the present disclosure. The bandgap circuit 1 includes a startup circuit 10 and an operational amplifier (Opamp) circuit 11. The bandgap circuit 1 is configured to provide an output signal Vbgr at a stable and predetermined voltage level by using the Opamp circuit 11 as a core. The startup circuit 10 is coupled to the Opamp circuit 11, and configured to control operations of the Opamp circuit 11 when the bandgap circuit 1 is powered on or the bandgap circuit 1 just got initiated. Specifically, there are some circuit components inside the bandgap circuit 1 coupled to the Opamp circuit 11 for realizing functions of the bandgap circuit are omitted for simplicity, but persons skilled in the art can make necessary modifications to the bandgap circuit 1 based on different system requirements.

The startup circuit 10 includes a start referencing circuit 12, a driving circuit 13, a pull-down circuit 14, and pull-up circuits 15, 16. At initiations of the bandgap circuit 1, a reference operating voltage VPP for driving the bandgap circuit 1 and an enabling signal ENHV for enabling the Opamp circuit 11 may be provided to the bandgap circuit 1 simultaneously. The reference operating voltage VPP and the output signal Vbgr may be started from a ground voltage level at the start of initiation and may be gradually increased after that. Since the Opamp circuit 11 is a circuit designed to generate an output signal at bi-stable states, the startup circuit 10 is configured to stabilize the output signal generated by the Opamp circuit 11 at a predetermined state, so the bandgap circuit 1 may be initiated and starting its functions properly.

During the initiating process, the referencing circuit 12 receives the enabling signal ENHV ramping from a disabled voltage level (e.g., the ground voltage level) to an enabled voltage level (e.g., the operating voltage level) to generate a reference signal Va. Specifically, the enabling signal ENHV and the reference signal Va are in phase, which are increased together during initiating. In some embodiments, the referencing circuit 12 includes transistors MP0, MP1, MN0, MN1, The transistors MP0, MN0, MN1 are serially coupled between the reference operating voltage VPP and a reference ground voltage VSS, with the transistors MP0, MN1 respectively coupled to receive the reference operating voltage VPP and the reference ground voltage VSS, and the transistor MN0 coupled between the transistors MP0, MN1. Both of the transistors MP0, MN0 are controlled by the ramping enabling signal ENHV to selectively provide one of the reference operating voltage VPP and the reference ground voltage VSS to their drains. Further, the transistor MN1 is controlled by a bias voltage Vbias, and thus limits a current flowing through the transistors MP0, MN0, MN1. As the enabling signal ENHV and the reference operating voltage VPP continue increase, the transistor MN0 is gradually turned on (i.e., conductive) by the enabling signal ENHV, and the reference ground voltage VSS is provided to the drain of the transistor MN0, and further mirrored to gates of the transistors MP1_, MP2, causing the transistor MP2 to be turned on (i.e., conductive). Consequently, the reference operating voltage VPP is provided by the transistor MP2 to an output end of the referencing circuit 12 and further to an input end of the driving circuit 13.

The driving circuit 13 includes a plurality of buffer circuit BUF1-BUF3 coupled in series between the referencing circuit 12 and the Opamp circuit 11. In some embodiments, each of the buffers BUF1-BUF3 may be implemented by an inverter which generates an output signal by inverting a received input signal, so a driving signal Vb may be generated at an output end of the driving circuit 13 according to the reference signal Va, and further provided to an enable end of the Opamp circuit 11.

Further, the pull-up circuits 15, 16 are coupled to the output end of the driving circuit 13, to selectively respectively control voltages at a positive end and an output end of the Opamp circuit 11. Specifically, the pull-up circuits 15, coupled between the reference operating voltage VPP and the positive input end of the Opamp circuit 11, is controlled by the driving signal Vb, so the voltage at the positive input end of the Opamp 11 may be pulled up according to the driving signal Vb during the initiations. Similarly, the pull-up circuits 16, coupled between the positive input end of the Opamp circuit 11 and the output end of the Opamp circuit 11, is also controlled by the driving signal Vb, so the voltage at the output end of the Opamp circuit 11 may be pulled up according to the driving signal Vb during initiations. In other words, the pull-up circuits 15, 16 may actively define voltages of the positive input end and the output end of the Opamp circuit 11 during initiations, rather than keeping the positive input end and output end of the Opamp circuit 11 floating.

In some embodiments, the driving circuit 13 further includes a transistor MN2 and a capacitor C1. The transistor MN2 is coupled between the input end of the driving circuit 13 and the reference ground voltage VSS, and is configured as a switch controlled by an enabling signal ENHVF. The enabling signal ENHVF is inverted to the enabling signal ENHV, so the transistors MP0-MP2 and the transistor MN2 may be turned on (i.e., conductive) together. When the enabling signal ENHVF is at the enabled voltage level, the transistor MN2 may be turned on (i.e., conductive) to couple the reference ground voltage VSS to the input end of the driving circuit 13. Further, the capacitor C1 is coupled to an input end of buffer circuit BUF3 and the reference ground voltage VSS. The capacitor C1 may be configured as a decoupling capacitor to bypass high frequency noise to ground.

Moreover, a loop structure is constructed in the bandgap circuit 1 through feedback of the output signal Vbgr to the input end of the driving circuit 13. Particularly, the pull-down circuit 14 is coupled to receive the output signal Vbgr, so the pull-down circuit 14 may selectively down the voltage at the input end of the driving circuit 13 according to the output signal Vbgr. When the output signal Vbgr is increased to be greater than or equal to threshold voltages of the transistors MNx[0]-MNx[5], the transistors MNx[0]-MNx[5] are turned on (i.e., conductive) to pull down the voltage at the input end of the driving circuit 13, thereby controlling the reference operating voltage VPP to be disconnected from the positive input end and the output end of the Opamp circuit 11 by the pull-up circuit 15, 16. As such, the pulled down voltage at the input end of the driving circuit 13 causes the driving signal Vb to be inverted, and the pull-up circuits 15 16 are turned off (nonconductive) accordingly to end the initiating process.

Figure 1B:
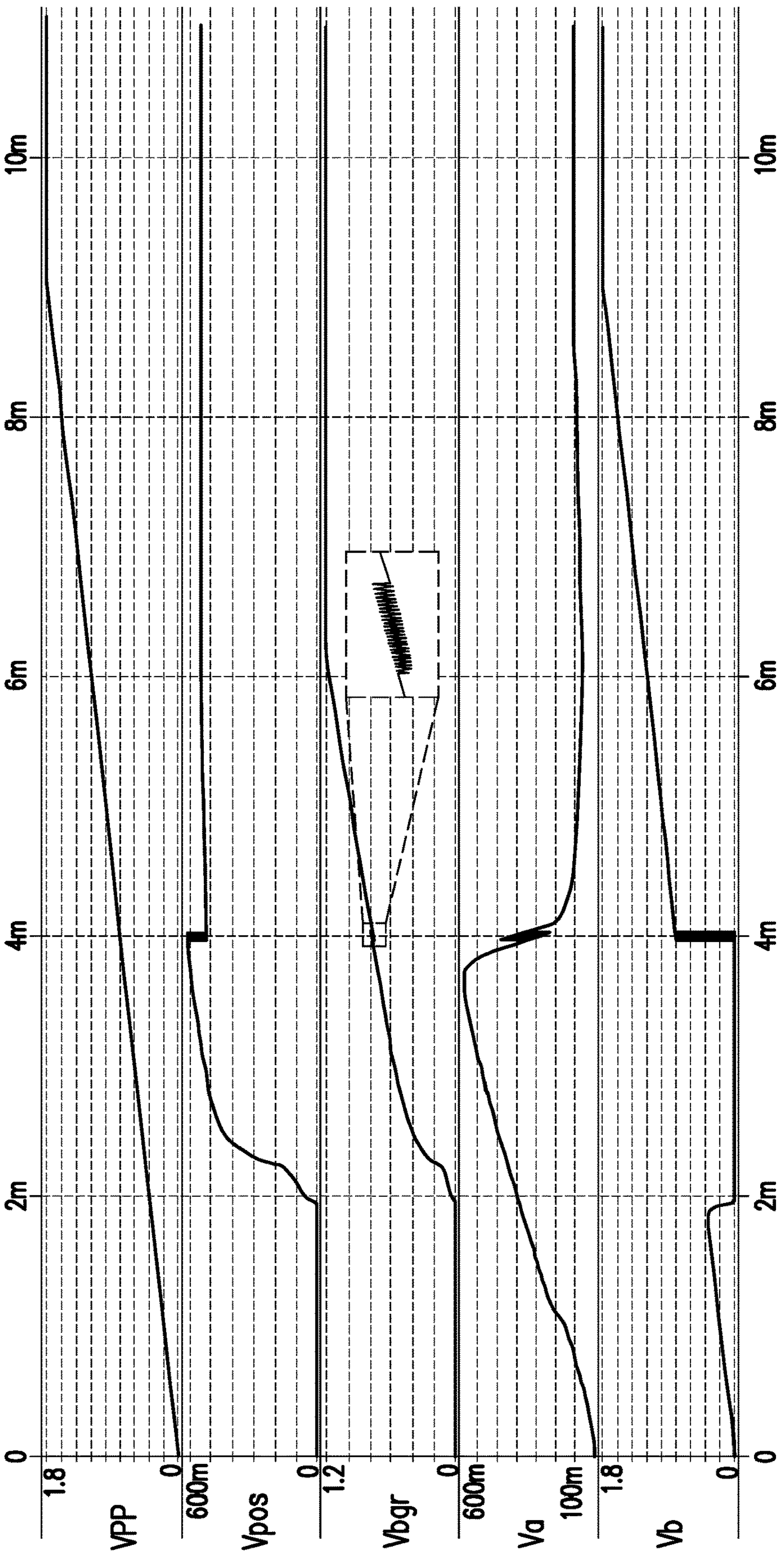
FIG. 1B illustrates waveforms of the bandgap circuit according to some embodiments of the present disclosure.

FIG. 1B illustrates waveforms of the bandgap circuit 1 according to some embodiments of the present disclosure. In FIG. 1B, waveforms of the reference operating voltage VPP, a voltage Vpos at the positive input end of the Opamp circuit 11, the output signal Vbgr generated by the Opamp circuit 11, the reference signal Va provided to the input end of the driving circuit 13, and the driving voltage generated by the driving circuit 13 are illustrated.

As can be observed, at the beginning of the initiation process, the reference operating voltage VPP is ramping from the disabled voltage level (e.g., the ground voltage level). The ramping reference operating voltage VPP is mirrored as the reference signal Va by the start referencing circuit 12, and further provided to the driving circuit 13. The driving circuit 13 is configured to generate the output signal Vb either using the reference operating voltage VPP or the reference ground voltage VSS according to the reference signal Va. When the driving signal Vb is at the disabled voltage level (i.e., the ground voltage level), the reference operating voltage VPP is provided to the output end and the positive input end of the Opamp circuit 11 by the pull-up circuits 15, 16, causing the output signal Vbgr to rise together with the reference operating voltage VPP. Particularly, when the output signal Vbgr is increased to a threshold voltage level of transistors MNx[0]-MNx[5] inside the pull-down circuit 14, the transistors MNx[0]-MNx[5] are turned on (conductive) to draw a current from the output end of the start referencing circuit 12 to the reference ground voltage VSS, causing the reference signal Va to drop. During the reference signal Va is falling and reaches a predetermined threshold voltage of the driving circuit 13, the driving signal Vb will be pulled up. However, the rapid rising edge of the driving signal Vb is coupled to the output signal Vbgr of the Opamp circuit 11, and further to the reference signal Va through the feedback loop structure. As a result, the reference signal Va, the driving signal Vb, and the output signal Vbgr together oscillate around the threshold voltage of the driving circuit 13, and thus signal stability and integrity of the bandgap circuit 1 is deteriorated.

Figure 2A:
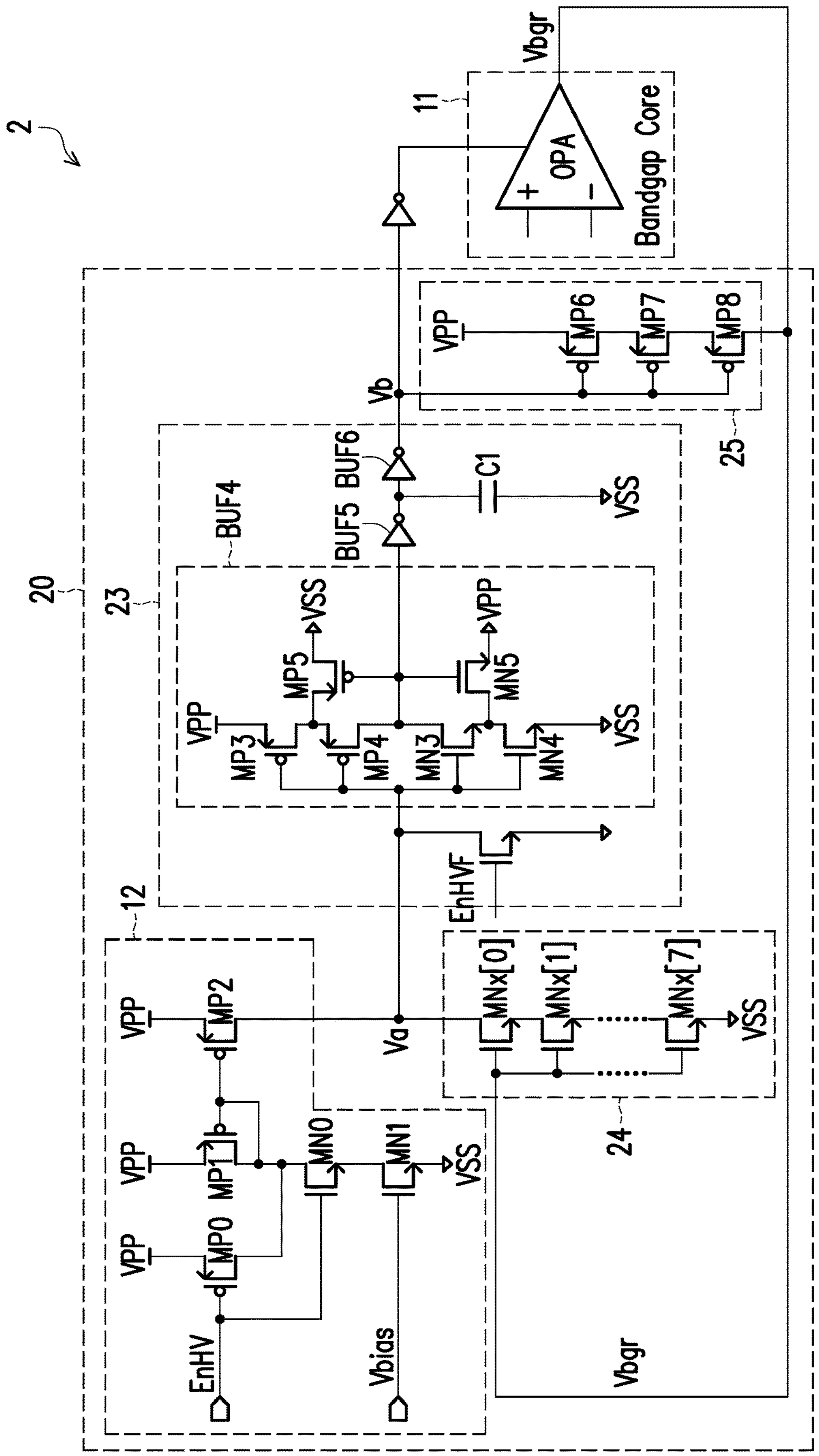
FIG. 2A illustrates a bandgap circuit according to some embodiments of the present disclosure.

FIG. 2A illustrates a bandgap circuit 2 according to some embodiments of the present disclosure. The bandgap circuit 2 in FIG. 2A is similar to the bandgap circuit 1 in FIG. 1A, so the same circuit blocks are labeled by the same symbols.

The bandgap circuit 2 includes a startup circuit 20 and an Opamp circuit 11. The startup circuit 20 includes a start referencing circuit 12, a driving circuit 23, a pull-down circuit 24, and a pull-up circuit 25. Detailed operations of the Opamp circuit 11 and the start referencing circuit 12 are described in above paragraphs related to FIG. 1A and are omitted herein. The driving circuit 23 is configured to receive the reference signal Va at the input end to accordingly generate the driving signal Vb at the output end. Particularly, the driving circuit 23 includes buffer circuits BUF4-BUF6 coupled in series between the start referencing circuit 12 and the Opamp circuit 11. More particularly, at least one of the buffer circuits BUF4-BUF6 is a hysteresis buffer. In this embodiment, the buffer circuit BUF4 in front of the serially coupled buffer circuits BUF4-BUF6 is a hysteresis buffer, and other buffer circuits BUF5, BUF6 may be implemented by inverters, and the driving signal Vb inverted to the reference signal Va is generated at the output end of the driving circuit 13 according to the reference signal Va, and further provided to an enable end of the Opamp circuit 11.

The buffer circuit BUF4 includes transistors MP3-MP5. MN3-MN5. The transistors MP3, MP4, MN3, MN4 are serially coupled between the reference operating voltage VPP and the reference ground voltage VSS. Gates of the transistors MN3, MN4, MP3, MP4 are coupled to the input end of the driving circuit 23 to receive the reference signal Va and a node coupled between the transistors MP4, MN3 are coupled to the output end of the buffer circuit BUF4. A source of the transistor MP5 is coupled to a node between the transistors MP3, MP4, to selectively provide the reference ground voltage VSS received at a drain of the transistor MP5 according to a voltage at the node between the transistors MP4, MN3. A source of the transistor MN5 is coupled to a node between the transistors MN3, MN4, to selectively provide the reference operating voltage VPP received at a drain of the transistor MN5. Assuming a first threshold voltage is the input voltage at which the output signal of the hysteresis circuit switches low to high. The source voltage of the transistor MP4 is responsible for that. Since the source voltage of the transistor MP4 depends on the output voltage feedback through the transistor MP5, the more width of feedback transistor MP5, the higher the first threshold voltage will be. Similarly, the same rule may be applied for the low to high condition on bottom side.

Figure 2B:
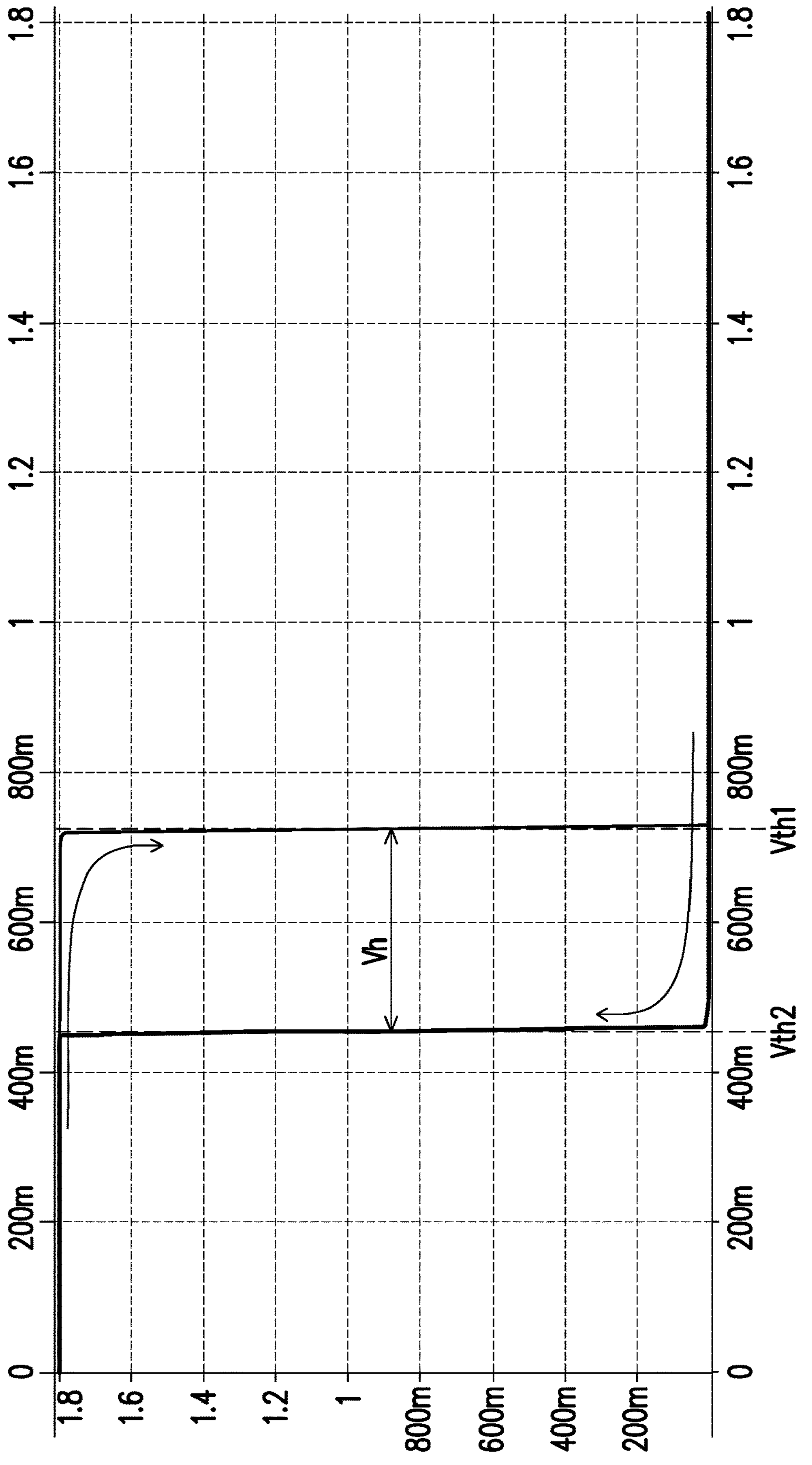
FIG. 2B illustrates a waveform of between input output and output signals of a hysteresis buffer according to some embodiments of the present disclosure.

FIG. 2B illustrates a waveform of between input output and output signals of a hysteresis buffer according to some embodiments of the present disclosure. The waveform in FIG. 2B depicts a relationship between input and output signals of the buffer circuit BUF4 in FIG. 2A.

In FIG. 213, a voltage of the input and output signals of the hysteresis buffer BUF4 are respectively illustrated in horizontal and vertical axis. When the input signal of the buffer circuit BUF4 is at the ground voltage level (e.g., 0V), the output signal of the buffer circuit BUF4 is at the enabled voltage level (e.g., 1.8V). As the voltage of the input signal of the buffer circuit BUF4 increases, the voltage of the output signal of the buffer circuit BUF4 is kept at the enabled voltage level (e.g., 1.8V) until the input voltage reaches the first threshold voltage Vth1. The output signal of the hysteresis buffer BUF4 is changed from the enabled voltage level (e.g., 1.8V) to the disabled voltage level (e.g., 0V) when the input signal of the hysteresis buffer is changed from below the first threshold voltage Vth1 to above the first threshold voltage Vth1. In contrast, the output signal of the hysteresis voltage is kept at the disabled voltage level when the input signal of the buffer circuit BUF4 is less than a second threshold voltage Vth2. The output signal of the buffer circuit is changed from the disabled voltage level (e.g., 0V) to the enabled voltage level (e.g., 1.8V) when the input signal of the buffer circuit is changed from above the second threshold voltage to below the second threshold voltage Vth2. Since the first threshold voltage Vth1 is greater than the second threshold voltage Vth2, a hysteresis window Vh is created by the first and second threshold voltages Vth1, Vth2. More particularly, when there are ripples of the input signal of the buffer circuit BUF4 within the hysteresis window Vh defined by the first and second threshold voltages Vth1, Vth2, the output signal generated by the hysteresis circuit may be kept at a stable voltage level as long as the input voltage of the hysteresis circuit exceeds the hysteresis window Vh between the first and second threshold voltages, thereby improving output stability of the buffer circuit BUF4.

Further, the driving signal Vb generated at the output end of the driving circuit 23 is provided to the pull-up circuit 25, so the pull-up circuit 25 may selectively pull up the output signal Vbgr generated at the output end of the Opamp circuit 11 according to the driving signal Vb. More particularly, a plurality of transistors MP6-MP8 are coupled in series between the reference operating voltage VPP and the output end of the Opamp circuit 11, and all gates of the transistors MP6-MP8 are controlled by the driving signal Vb. A total number of the transistors MP6-MP8 coupled in series of the pull-up circuit 25 may be more than a first predetermined number, so a current flowing through may be controlled to be lower than a first predetermined current value, and a rising rate of the output signal Vbgr at the output end of the Opamp circuit 25 is correspondingly slowed down.

Similarly, the pull-down circuit 24 is configured to selectively pull down the reference signal Va provided to the input end of the driving circuit 23 according to the output signal Vbgr. The pull-down circuit 24 includes a plurality of transistors MNx[0]-MNx[7] (e.g., there may be eight transistors MNx[0]-MNx[7] inside the pull-down circuit 24) are coupled in series between the input end of the driving circuit 23 and the output end of the Opamp circuit 11, and all gates of the transistors MNx[0]-MNx[7] are controlled by the output signal Vbgr. A total number of the transistors MNx[0]-MNx[7] coupled in series of the pull-up circuit 24 may be more than a second predetermined number, so a current flowing through may be controlled to be lower than a second predetermined current value, and a falling rate of the reference signal at the input end of the driving circuit 23 is correspondingly slowed down. Therefore, the pull-down circuit 24 and the pull-up circuit 25 may slow down the rising or falling rate of the output signal Vbgr and the reference signal Va, to further improve stability of the bandgap circuit 2.

Figure 2C:
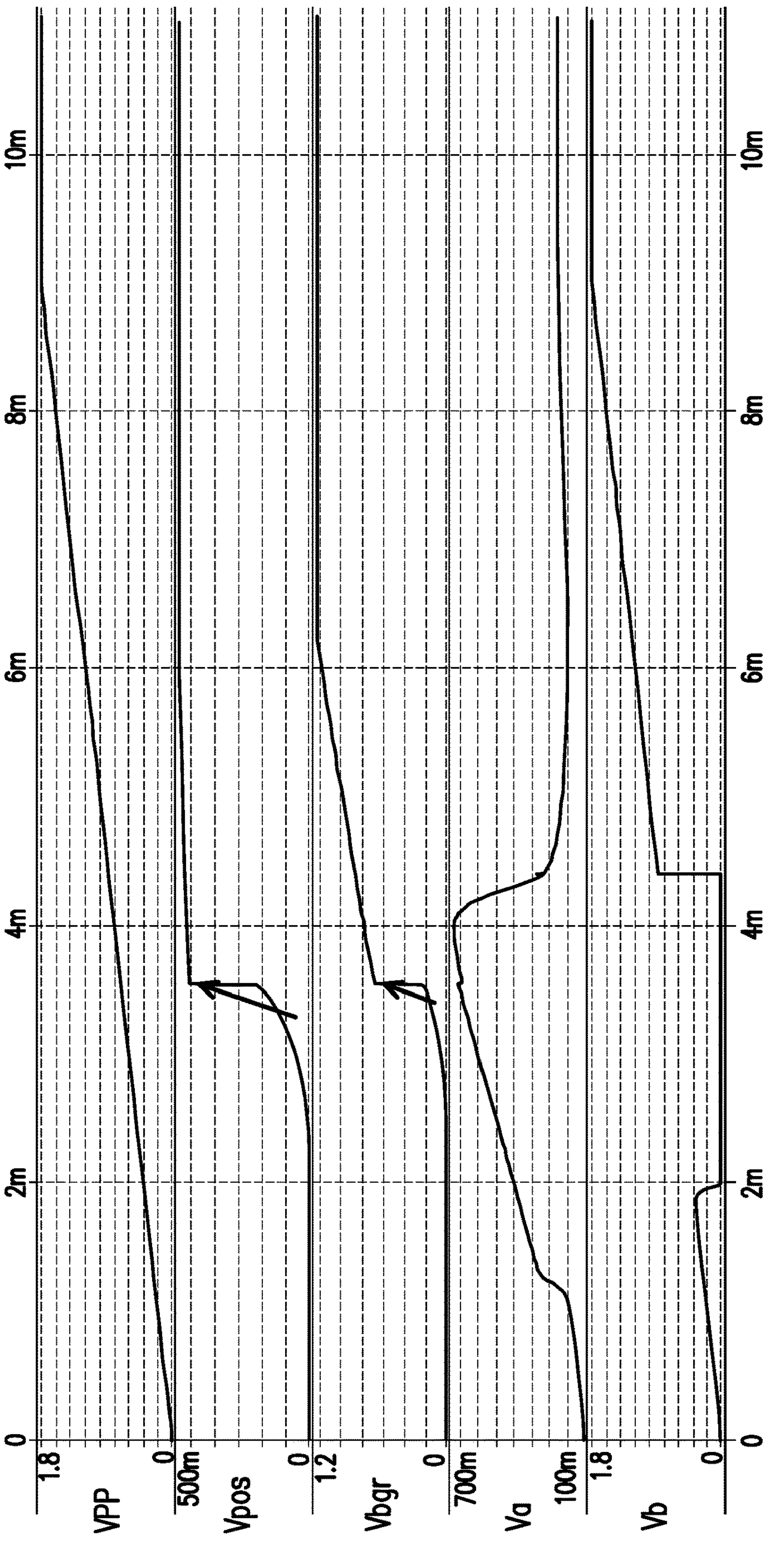
FIG. 2C illustrates waveforms of the bandgap circuit according to some embodiments of the present disclosure.

FIG. 2C illustrates waveforms of the bandgap circuit 2 according to some embodiments of the present disclosure. In FIG. 2C, waveforms of the reference operating voltage VPP, a voltage Vpos at the input end of the Opamp circuit 11, the output signal Vbgr generated by the Opamp circuit 11, the reference signal Va provided to the input end of the driving circuit 23, and a voltage at the output end of the driving circuit 23 are illustrated.

As can be observed, after the bandgap circuit 2 is initiated, the reference operating voltage VPP is ramping from the ground voltage level. During the initiating process, the reference voltage Va is changing steadily without oscillation, rendering the output signal Vb generated by the driving circuit 23 stable. Consequently, oscillations or ripples in the output signal Vbgr can be avoided, and quality of the output signal Vbgr is effectively improved.

In summary, the present disclosure utilizes the hysteresis buffer in the driving circuit to avoid stability of the output signal of the bandgap circuit to be affected by ripples occurred in the reference signal through feedback loop. Further, driving currents of the pull-up and/or the pull-down circuit utilized in the startup circuit are designed to be less than a predetermined current value, so the initiation process of the bandgap circuit may be kept steady by avoiding drastic changes in the reference signal and the driving signal Vb. Overall, a safe and steady startup process may be provided for the bandgap circuit without affecting its signal integrity and stability.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A startup circuit utilized for a bandgap circuit, the startup circuit comprising:

a start referencing circuit configured to receive an enabling signal ramping from a disabled voltage level to an enabled voltage level to generate a reference signal; and a driving circuit having an input end coupled to the start referencing circuit and an output end coupled to an operational amplifier (Opamp) circuit of the bandgap circuit, the driving circuit being configured to generate a driving signal to the Opamp circuit according to the reference signal, the driving circuit comprising a plurality of buffer circuits coupled in series and at least one of the buffer circuits being a hysteresis buffer.

2. The startup circuit of claim 1, wherein the hysteresis buffer is configured to change an output signal of the hysteresis buffer from the enabled voltage level to the disabled voltage level when an input signal of the hysteresis buffer is changed from below a first threshold voltage to above the first threshold voltage, the hysteresis buffer is configured to change the output signal of the hysteresis buffer from the disabled voltage level to the enabled voltage level when the input signal of the hysteresis buffer is changed from above a second threshold voltage to below the second threshold voltage, wherein the first threshold voltage is greater than the second threshold voltage.

3. The startup circuit of claim 2, wherein the hysteresis buffer comprises:

a first transistor having a source coupled to receive a reference operating voltage;

a second transistor having a source coupled to a drain of the first transistor;

a third transistor having a drain coupled to a drain of the second transistor;

a fourth transistor having a drain coupled to a source of the third transistor and a source coupled to receive a reference ground voltage; and a fifth transistor having a source coupled to a node between the first and second transistors, a drain coupled to receive the reference ground voltage, and a gate coupled to a node between the second and third transistors;

a sixth transistor having a drain coupled to a node between the third and fourth transistors, a source coupled to receive the reference operating voltage, and a gate coupled to a node between the second and third transistors, wherein the first, second and fifth transistors are p-type transistors, and the third, fourth, and sixth transistors are n-type transistors.

4. The startup circuit of claim 1, wherein the driving circuit comprises:

a first buffer circuit to a third buffer circuit serially coupled in sequence between the start referencing circuit and the Opamp circuit, wherein the first buffer circuit is the hysteresis circuit.

5. The startup circuit of claim 4, wherein the driving circuit further comprises:

a switch coupled to the input end of the driving circuit and being configured to pull down a voltage at the input end of the driving circuit to the disabled voltage level when the enabling signal is at the enabled voltage level; and a capacitor having a first end coupled to a node between the second buffer circuit and the third buffer circuit and a second end coupled to a reference ground voltage.

6. The startup circuit of claim 1, further comprising:

a pull-down circuit coupled between the input end of the driving circuit and a reference ground voltage, the pull-down circuit being controlled by a voltage at the output end of the Opamp circuit to selectively provide the reference ground voltage to the input end of the driving circuit.

7. The startup circuit of claim 6, wherein the pull-down circuit comprises a plurality of n-type transistors coupled in series between the input end of the driving circuit and the reference ground voltage, and gates of the plurality n-type transistors are coupled to the output end of the Opamp circuit.

8. The startup circuit of claim 1, further comprising:

a pull-up circuit coupled between a reference operating voltage and an output end of the Opamp circuit, the pull-up circuit being controlled by a voltage at the output end of the driving circuit to selectively provide the reference operating voltage to the output end of the Opamp circuit.

9. The startup circuit of claim 8, wherein the pull-up circuit comprises a plurality of p-type transistors coupled in series between the reference operating voltage and the output end of the Opamp circuit, and gates of the plurality p-type transistors are coupled to the output end of the driving circuit.

10. A bandgap circuit, comprising:

an operational amplifier (Opamp) circuit; and a startup circuit comprising:

a start referencing circuit configured to receive an enabling signal ramping from a disabled voltage level to an enabled voltage level to generate a reference signal; and a driving circuit having an input end coupled to the start referencing circuit and an output end coupled to the Opamp circuit, the driving circuit being configured to generate a driving signal to the Opamp circuit according to the reference signal, the driving circuit comprising a plurality of buffer circuits coupled in series and at least one of the buffer circuits being a hysteresis buffer.

* * * * *